United States Patent
Bezerra Rufino Ferreira Paiva et al.

(10) Patent No.: US 11,885,305 B2
(45) Date of Patent: Jan. 30, 2024

(54) METHOD OF DETERMINING THE WIND SPEED IN THE ROTOR PLANE OF A WIND TURBINE

(71) Applicant: IFP Energies nouvelles, Rueil-Malmaison (FR)

(72) Inventors: Eduardo Bezerra Rufino Ferreira Paiva, Rueil-Malmaison (FR); Hoai-Nam Nguyen, Rueil-Malmaison (FR); Olivier Lepreux, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 168 days.

(21) Appl. No.: 17/514,061

(22) Filed: Oct. 29, 2021

(65) Prior Publication Data

US 2022/0145856 A1    May 12, 2022

(30) Foreign Application Priority Data

Nov. 6, 2020 (FR) ........................ 2011395

(51) Int. Cl.
*F03D 7/04* (2006.01)
*F03D 17/00* (2016.01)
(Continued)

(52) U.S. Cl.
CPC ............. *F03D 7/045* (2013.01); *F03D 17/00* (2016.05); *G01P 21/025* (2013.01);
(Continued)

(58) Field of Classification Search
CPC . F03D 7/045; F03D 17/00; G01P 5/00; G01P 5/06; G01P 5/08; G01P 5/26;
(Continued)

(56) References Cited

U.S. PATENT DOCUMENTS

| 6,320,272 B1 * | 11/2001 | Lading | F03D 7/0224 |
| | | | 290/55 |
| 2006/0033338 A1 * | 2/2006 | Wilson | F03D 7/0224 |
| | | | 700/282 |

(Continued)

FOREIGN PATENT DOCUMENTS

| CN | 109242218 A * | 1/2019 | ........... G06K 9/6223 |
| FR | 2976630 A1 | 12/2012 | |

(Continued)

OTHER PUBLICATIONS

Yu Jie, et al: "A Gaussian mixture copula model based localized Gaussian process regression approach for long-term wind speed prediction." Energy, Elsevier, Amsterdam, NL, vol. 61, Oct. 3, 2013. pp. 673-686, XP028743548, ISSN: 0360-5442, DOI: 10.1016/J. Energy. Sep. 13, 2013.

(Continued)

*Primary Examiner* — John M Zaleskas
(74) *Attorney, Agent, or Firm* — Fitch, Even, Tabin & Flannery LLP (57) ABSTRACT

The present invention relates to a method of determining the wind speed in the plane of a rotor (PR) of a wind turbine (1), by measuring (MES2) the rotational speed of the rotor, the angle of the blades and the generated power. The method according to the invention uses a wind turbine model (MOD) constructed from wind speed measurements (LID), and by use of measurement clustering (GRO) and regressions (REG).

16 Claims, 3 Drawing Sheets

(51) Int. Cl.
*G01P 21/02* (2006.01)
*G01P 5/26* (2006.01)
*G01S 17/58* (2006.01)
*G06F 113/06* (2020.01)
*G06F 113/08* (2020.01)

(52) U.S. Cl.
CPC ..... *F05B 2260/821* (2013.01); *F05B 2260/84* (2013.01); *F05B 2270/32* (2013.01); *F05B 2270/327* (2013.01); *F05B 2270/328* (2013.01); *F05B 2270/335* (2013.01); *F05B 2270/8042* (2013.01); *G01P 5/26* (2013.01); *G01S 17/58* (2013.01); *G06F 2113/06* (2020.01); *G06F 2113/08* (2020.01)

(58) Field of Classification Search
CPC .... G01P 18/23; G01P 21/025; G01P 2119/14; G01P 30/17; G01P 30/28; G01S 17/58; G01S 17/95; F05B 2260/821; F05B 2260/84; F05B 2270/32; F05B 2270/327; F05B 2270/328; F05B 2270/335; F05B 2270/8042; G06F 2113/06; G06F 2113/08; Y02E 10/72
See application file for complete search history.

(56) References Cited

U.S. PATENT DOCUMENTS

| | | | | |
|---|---|---|---|---|
| 2007/0125165 A1* | 6/2007 | Ormel | ............ | F03D 7/02 73/170.01 |
| 2008/0307853 A1* | 12/2008 | Siebers | ............ | G01P 21/025 290/55 |
| 2010/0237617 A1* | 9/2010 | Vyas | ............ | G06Q 50/06 290/44 |
| 2012/0078518 A1* | 3/2012 | Krishna | ............ | F03D 17/00 702/3 |
| 2015/0097373 A1 | 4/2015 | Esbensen | | |
| 2015/0145253 A1* | 5/2015 | Bayon | ............ | F03D 9/25 416/61 |
| 2017/0314533 A1* | 11/2017 | Atzler | ............ | F03D 7/0276 |
| 2017/0321660 A1* | 11/2017 | Atzler | ............ | G01P 5/00 |
| 2018/0017039 A1* | 1/2018 | Davoust | ............ | F03D 7/0224 |
| 2018/0363627 A1* | 12/2018 | Nayebi | ............ | G05B 13/042 |
| 2019/0048853 A1* | 2/2019 | Engelken | ............ | F03D 7/0284 |
| 2019/0338755 A1* | 11/2019 | Davoust | ............ | F03D 7/043 |
| 2020/0063710 A1* | 2/2020 | Farrokhabadi | ............ | F03D 17/00 |
| 2020/0124026 A1* | 4/2020 | Nguyen | ............ | G01S 17/95 |
| 2020/0166650 A1* | 5/2020 | Guillemin | ............ | G06F 17/17 |
| 2020/0182225 A1* | 6/2020 | Nielsen | ............ | F03D 17/00 |
| 2020/0301020 A1* | 9/2020 | Guillemin | ............ | F03D 17/00 |
| 2020/0400836 A1* | 12/2020 | Nguyen | ............ | G01S 17/95 |
| 2021/0148331 A1* | 5/2021 | Lin | ............ | F03D 17/00 |
| 2021/0279389 A1* | 9/2021 | Guillemin | ............ | F03D 17/00 |
| 2021/0311196 A1* | 10/2021 | Nabi | ............ | G01S 7/4808 |
| 2021/0396211 A1* | 12/2021 | De Bot | ............ | F03D 7/045 |
| 2022/0213870 A1* | 7/2022 | De Bot | ............ | F03D 7/045 |

FOREIGN PATENT DOCUMENTS

| | | | | |
|---|---|---|---|---|
| FR | 2996266 | A1 | 4/2014 | |
| FR | 3013777 | A1 | 5/2015 | |
| FR | 3068139 | A1 | 12/2018 | |
| FR | 3088971 | A1 | 5/2020 | |
| WO | WO-2007010322 | A1 * | 1/2007 | ........... F03D 1/0608 |
| WO | 2017211367 | A1 | 12/2017 | |
| WO | WO-2019150805 | A1 * | 8/2019 | |

OTHER PUBLICATIONS

J. Mayer, et al. "Position and Speed Estimation of PMSMs Using Gaussian Processes," in 21st IFAC World Congress, Jul. 12-17, 2020, 8 pages.

D. Arthur et al. "k-means++: The Advantages of Careful Seeding"; Stanford InfoLab, Technical Report, Jun. 2006; 9 pages.

* cited by examiner

METHOD OF DETERMINING THE WIND SPEED IN THE ROTOR PLANE OF A WIND TURBINE

CROSS-REFERENCE TO RELATED APPLICATION

This application claims priority from French Application No. 20/11.395 filed Nov. 6, 2020 which is hereby incorporated herein by reference in its entirety.

BACKGROUND OF THE INVENTION

Field of the Invention

The present invention relates to the field of renewable energy and more particularly to the measurement of the wind as the resource of wind turbines, by use of wind prediction, and at least one of turbine control (orientation, torque and speed regulation), diagnosis and monitoring objectives.

Description of the Prior Art

A wind turbine converts the kinetic energy from the wind into electrical or mechanical energy. For wind energy conversion, the wind turbine is made up of the following elements:
- a tower for positioning a rotor at a sufficient height to enable motion thereof (necessary for horizontal-axis wind turbines) or the rotor to be positioned at a height enabling it to be driven by a stronger and more regular wind than at ground level. The tower can generally house part of the electrical and electronic components (modulator, control, multiplier, generator, etc.),
- a nacelle mounted at the top of the tower which houses the mechanical, pneumatic and some electrical and electronic components necessary to operate the turbine. The nacelle can rotate to orient the rotor in the correct direction to generate electricity,
- a rotor fastened to the nacelle, comprising blades (generally three) and the hub of the wind turbine. The rotor is driven by the wind energy and it is connected by a mechanical shaft, directly or indirectly (via a gearbox and mechanical shaft system), to an electrical machine (electrical generator) or to any other type of conversion machine that converts the energy recovered into electrical energy or any type of energy. The rotor is potentially provided with control systems such as a variable-angle blades or aerodynamic brakes,
- possibly a transmission having two shafts (mechanical shaft of the rotor and mechanical shaft of the conversion machine) connected by a transmission (gearbox), which forms a kinematic chain between the mechanical shaft of the rotor and the mechanical shaft of the conversion machine.

Since the early 1990s, there has been renewed interest in wind power, in particular in the European Union where the annual growth rate is about 20%. This growth is attributed to the inherent possibility for carbon-free electricity generation. In order to sustain this growth, the energy yield of wind turbines still needs to be further improved. The prospect of a wind power production increase requires development of effective production tools and advanced control tools in order to improve the performances of the machines. Wind turbines are designed to produce electricity at the lowest possible cost. They are therefore generally built to reach their maximum performance at a wind speed of approximately 12 m/s. It is not necessary to design wind turbines that maximize their yield at higher wind speeds, which are not common. In case of wind speeds above 12 m/s, it is necessary to lose part of the additional energy contained in the wind so as to avoid damage to the wind turbine. All wind turbines are therefore designed with a power regulation system.

For this power regulation, controllers have been designed for variable-speed wind turbines. The purpose of the controllers is to maximize the electrical power recovery, to minimize the rotor speed fluctuations, and to minimize the fatigue and the extreme moments of the structure (blades, tower and platform).

To optimize control, it is important to know the wind speed at the rotor of the wind turbine. Various techniques have been developed to that end.

According to a first technique, using an anemometer allows estimation of wind speed at one point, but this imprecise technology does not enable to measure an entire wind field or to have knowledge of the three-dimensional components of the wind speed.

According to a second technique, a LiDAR (Light Detection And Ranging) sensor can be used. LiDAR is a remote sensing or optical measurement technology based on the analysis of the properties of a beam returned to the emitter. This method is notably used for determining the distance to an object by use of a pulse laser. Unlike radars based on a similar principle, LiDAR sensors use visible or infrared light instead of radio waves. The distance to an object or a surface is given by the measurement of the delay between the pulse and the detection of the reflected signal.

In the field of wind turbines, LiDAR sensors are essential for proper functioning of large wind turbines, especially now that their size and power is increasing (today 5 MW, soon 12 MW for offshore turbines). This sensor enables remote wind measurements, first allowing wind turbines to be calibrated to deliver maximum power (power curve optimization). For this calibration stage, the sensor can be positioned on the ground and vertically oriented (profiler), which allows measurement of the wind speed and direction, as well as the wind gradient depending on the altitude. This application is particularly critical because it provides knowledge of the energy generating resource. This is important for wind turbine projects since it conditions the financial viability of the project.

A second application sets the sensor on the nacelle of the wind turbine in order to measure the wind field in front of the turbine while being nearly horizontally oriented. A priori, measuring the wind field in front of the turbine provides knowledge in advance the turbulence of the wind that the turbine is going to encounter shortly thereafter. However, current wind turbine control and monitoring techniques do not allow accounting for a measurement performed by a LiDAR sensor by estimating precisely the wind speed at the rotor in the rotor plane. Such an application is notably described in patent application FR-3-013,777 corresponding to US published patent application 2015-145,253.

However, a LiDAR sensor is an expensive sensor. Furthermore, since LiDAR sensors have only been developed relatively recently, it is still difficult to know, by converting raw data from the LiDAR sensor, how to exploit the wind field characteristics, such as wind speed, wind direction, wind shear, turbulence, induction factor, etc. LiDAR sensors require a complex implementation to determine the wind speed in the rotor plane. It is therefore necessary to determine the wind speed in the rotor plane in an inexpensive, reliable and directly usable manner, for at least one of control and diagnosis of the wind turbine.

SUMMARY OF THE INVENTION

The purpose of the present invention is to determine, in real time, in an inexpensive and reliable manner, with no specific instruments, the wind speed in the rotor plane. The present invention therefore relates to a method for determining the wind speed in the plane of a rotor of a wind turbine, by measuring the rotational speed of the rotor, the angle of the blades and the generated power. The method according to the invention implements a wind turbine model constructed from wind speed measurements, and use of measurement clustering and regressions. Thus, once the wind turbine model constructed, this model can be applied in real time, in a reliable manner and with no specific instruments, to determine the wind speed in the rotor plane from measurements of the rotational speed of the rotor, the angle of the blades and the generated electrical power.

The invention relates to a method of determining wind speed in a rotor plane of a wind turbine, comprising steps of:
  a) constructing a wind turbine model relating rotational speed of the rotor of the wind turbine, an inclination angle of blades of the wind turbine and power generated by a conversion machine of wind turbine to the wind speed in a rotor plane of the wind turbine by steps of:
     i. measuring simultaneously the wind speed in the rotor plane of the wind turbine and the rotational speed of the rotor, the inclination angle of the blades and the power generated by the conversion machine of said wind turbine;
     ii. classifying the simultaneous measurements of the wind speed in the rotor plane of the wind turbine, the rotational speed of the rotor, inclination angle of the blades and the power generated by the conversion machine of the wind turbine into at least two classes of wind turbine operating conditions;
     iii. for each class, determining a regression between measurements of wind speed in the rotor plane of the wind turbine and rotational speed of the rotor, an inclination angle of the blades and the power generated by the conversion machine of the wind turbine by use of a basis function decomposition method, and by use of a method for establishing a relation between the basis functions and the wind speed in the rotor plane, preferably by of a Gaussian process regression method and a least-squares regression method; and
     iv. constructing the model of the wind turbine by use of regressions determined for each class;
  b) measuring in real time the rotational speed of the rotor, the inclination angle of the blades and the power generated by the conversion machine of the wind turbine; and
  c) determining in real time the wind speed in the plane of the rotor of the wind turbine by use of the real-time measurements of the rotational speed of the rotor, of the inclination angle of the blades and of the power generated by the conversion machine of the wind turbine and the wind turbine model.

According to one embodiment, the measurements of the wind speed, of the rotational speed of the rotor, of the inclination angle of the blades and of the power generated by the conversion machine of the wind turbine are classified into at least two wind turbine operating condition classes using a classification method, notably a k-means algorithm and preferably a k-means++algorithm.

Advantageously, the number of classes ranges between 3 and 10, preferably between 4 and 7.

According to one implementation, the wind speed in the rotor plane is measured based on LiDAR sensor measurements.

According to one aspect, the wind speed in the plane of the rotor of the wind turbine is determined in real time by determination of the Euclidean distance between the real-time measurements of the rotational speed of the rotor, of the inclination angle of the blades and of the power generated by the conversion machine of the wind turbine and the center of each class, and the wind turbine model is applied by a weighted combination of the regressions of each class, with weighting depending on the Euclidean distance.

According to an embodiment option, the wind speed in the plane of the rotor of the wind turbine is predicted for at least one future time interval, from the wind turbine model and the real-time measurements of the rotational speed of the rotor, of the inclination angle of the blades and of the power generated by the conversion machine of the wind turbine.

The invention further relates to a method of controlling a wind turbine. This method comprises the following steps:
  a) determining the wind speed in the rotor plane of the wind turbine by use of a method according to one of the above features; and
  b) controlling the wind turbine according to the wind speed in the rotor plane of the wind turbine.

Furthermore, the invention relates to a computer program product comprising code instructions for carrying out the steps of a method according to one of the above features, when the program is executed on at least one of a control and diagnosis unit of the wind turbine.

The invention relates to a wind turbine comprising means for measuring the rotational speed of the rotor, means for measuring the inclination angle of the wind turbine blades, means for measuring the power generated by the conversion machine of the wind turbine and means for determining the wind speed in the rotor plane of the wind turbine able to implement the method according to any one of the above features.

According to one embodiment, the wind turbine comprises a real-time control and data acquisition system including the means for measuring the rotational speed of the rotor, the means for measuring the inclination angle of the wind turbine blades and the means for measuring the power generated by the conversion machine of the wind turbine.

BRIEF DESCRIPTION OF THE DRAWINGS

Other features and advantages of the method and of the system according to the invention will be clear from reading the description hereafter of embodiments given by way of non-limitative example, with reference to the accompanying drawings wherein.

DETAILED DESCRIPTION OF THE INVENTION

The present invention relates to a method of determining in real time the wind speed in the rotor plane of a wind turbine, for example the effective wind speed in the rotor plane of a wind turbine.

Figure 1:
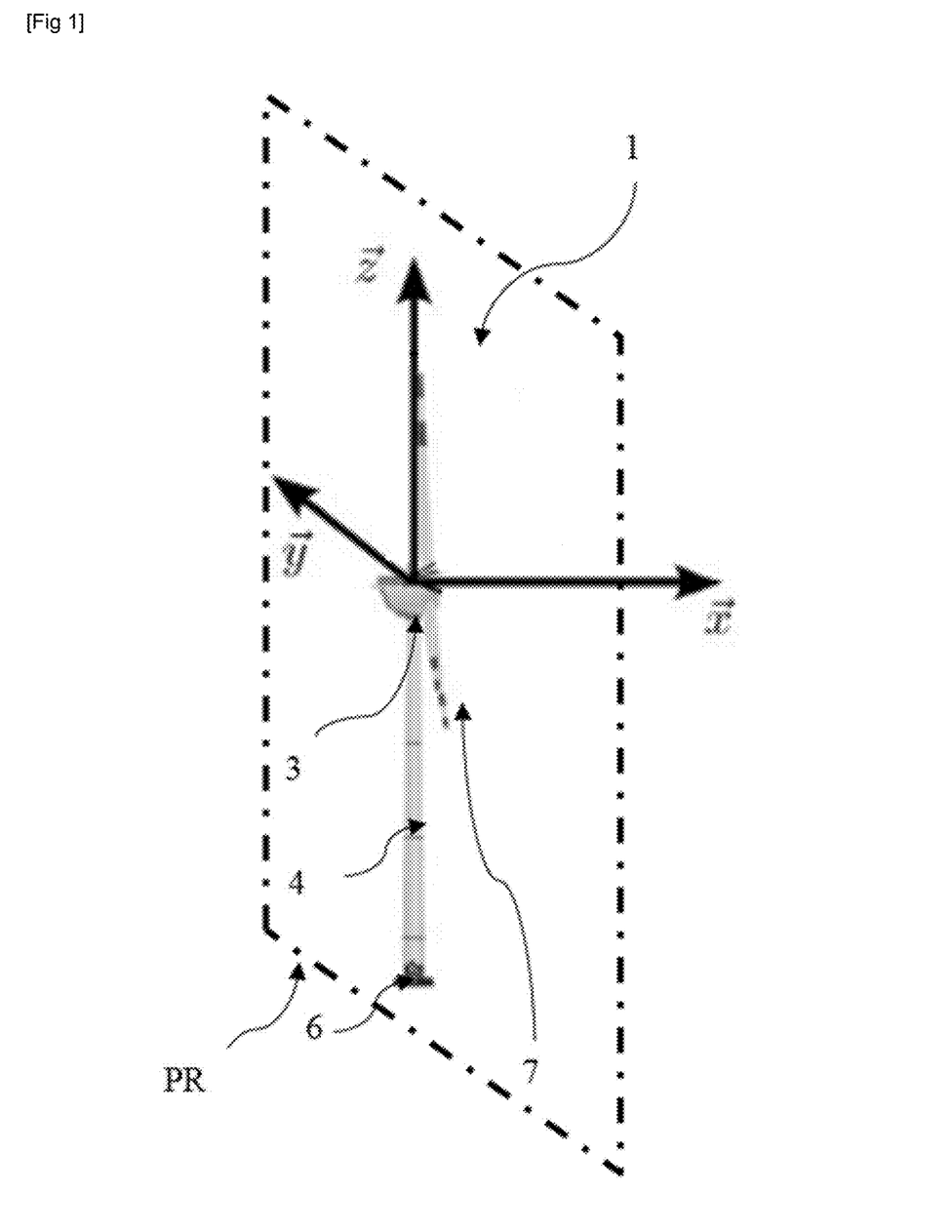
FIG. 1 illustrates a wind turbine according to an embodiment of the invention.

FIG. 1 schematically shows, by way of non-limitative example, a horizontal-axis wind turbine 1 for performing the method according to an embodiment of the invention. Conventionally, a wind turbine 1 converts the kinetic energy of the wind into electrical or mechanical energy. For wind energy conversion, the turbine has the following elements:
- a tower 4 for positioning a rotor (not shown) at a sufficient height to enable motion thereof (necessary for horizontal-axis wind turbines) or allowing this rotor to be positioned at a height enabling it to be driven by a stronger and more regular wind than at ground level 6. Tower 4 can generally house part of the electrical and electronic components (modulator, control, multiplier, generator, etc.);
- a nacelle 3 mounted at the top of tower 4 which houses mechanical, pneumatic and some electrical and electronic components (not shown) necessary for operating the conversion machine. Nacelle 3 can rotate to orient the machine in the right direction; for power generation
- the rotor, fastened to the nacelle, comprising blades 7 (generally three) and the hub of the wind turbine. The rotor is driven by the energy from the wind and it is connected by a mechanical shaft, directly or indirectly (via a gearbox and mechanical shaft system), to an electrical machine (electric generator) or to any other conversion machine (hydraulic or pneumatic machine for example) that converts the energy recovered to electrical energy or any type of energy (hydraulic or pneumatic for example). The rotor is potentially provided with control systems such as a variable-angle blades or aerodynamic brakes; and
- possibly a transmission (not shown) made up of two connected shafts (mechanical shaft of the rotor and mechanical shaft of the conversion machine), which form a kinematic chain between the mechanical shaft of the rotor and the mechanical shaft of the conversion machine.

This figure also shows axes x, y and z. The reference point of this coordinate system is the center of the rotor. Direction x is the longitudinal direction corresponding to the direction of the rotor axis, upstream from the wind turbine. Direction y is perpendicular to direction x, is the lateral direction located in a horizontal plane (directions x, y form a horizontal plane). Direction z is the vertical direction (substantially corresponding to the direction of tower 4) pointing up, axis z is perpendicular to axes x and y. The rotor plane is indicated by the rectangle in dotted line PR which is defined by directions y, z for a zero value of x.

According to the invention, the method of determining the wind speed comprises the following steps:
1) constructing a wind turbine model
2) making measurements
3) determining the wind speed.

Steps 2 and 3 are carried out in real time, whereas the turbine model construction step 1 is carried out beforehand, only once. These steps can be carried out automatically by computer, notably by a controller of a wind turbine, comprising at least a memory and computing means such as a processor. These steps are described in detail in the rest of the description.

The first step of constructing a wind turbine model is carried out of substeps, so that the method of determining the wind speed comprises the following steps:
1) construction of a wind turbine model:
    a) making simultaneous measurements
    b) performing cluster classification
    c) performing regressions
    d) wind turbine model construction
2) making measurements
3) determining the wind speed.

Figure 2:
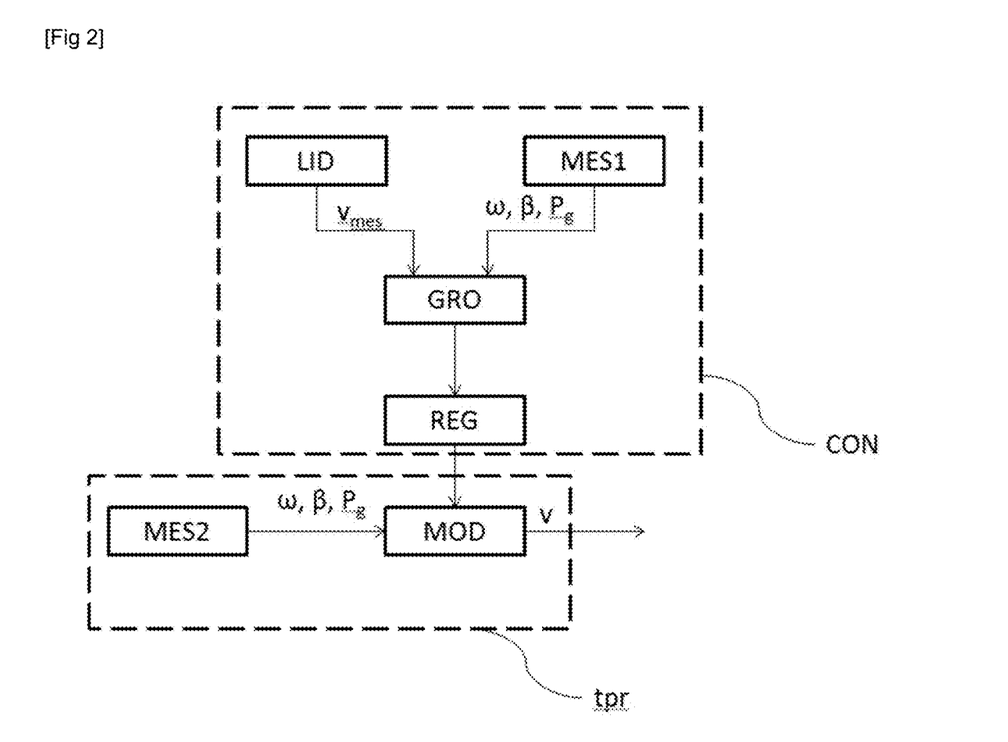
FIG. 2 illustrates the steps of the method according to an embodiment of the invention.

FIG. 2 schematically illustrates, by way of non-limitative example, the steps of the method according to an embodiment of the invention. A wind turbine model MOD is first constructed. Simultaneous measurements LID and MES1 of the wind speed $v_{mes}$ and of the rotational speed of the rotor $\omega$, of the inclination angle of the blades $\beta$ and of the power $P_g$ generated by the conversion machine of the wind turbine respectively are therefore acquired. The measurements are classified into clusters GRO. For each cluster, a regression REG is determined between the measurements to construct wind turbine model MOD. Then, in real time tpr and during operation of the wind turbine, measurements MES2 of only the rotational speed of the rotor $\omega$, the inclination angle of the blades $\beta$ and the power $P_g$ generated by the conversion machine of the wind turbine are acquired. The constructed model MOD is applied to these measurements to determine, in real time, wind speed v in the rotor plane.

According to one embodiment, the present invention can be implemented for determining the current wind speed (filtering).

In a variant, the present invention may be implemented for a wind speed prediction for at least one future time interval (predicting).

1) Construction of a Wind Turbine Model

This step constructs a wind turbine model. A wind turbine model is a model relating the rotational speed of the rotor, the inclination angle of the wind turbine blades and the power generated by the conversion machine of the wind turbine to the wind speed in the rotor plane of the wind turbine. According to the invention, this step is carried out beforehand, only once, during a model training run. Then, in real time, during operation of the wind turbine, the constructed turbine model is kept and only steps 2 and 3 are carried out. This wind turbine model can be seen as a map of the wind turbine.

The following substeps are carried out for this step:

a) Simultaneous Measurements

This substep simultaneously measures the wind speed in the rotor plane and the rotational speed of the rotor, the inclination angle of the blades of the wind turbine and the power generated by a conversion machine of the wind turbine which is in other words, the power generated by the wind turbine. All these measurements enable training of the wind turbine model. It can be noted that the wind speed is measured only in this construction step. Indeed, this measurement is not performed in real time. Thus, in real time, the method according to the invention requires no specific instruments. This wind speed measurement allows construction of a representative wind turbine model, allowing the wind speed sensor to be replaced.

According to one embodiment of the invention, the wind speed can be measured in the rotor plane of a sensor arranged on the wind turbine, a LiDAR sensor for example. This embodiment of the invention can implement a wind speed reconstruction method as described notably in patent applications FR-3,068,139 corresponding to US published patent application 2020/0,124,026 and FR-3,088,971 corresponding to US published patent application 2020/0,166,650.

Alternatively, the wind speed in the rotor plane can be measured using any other device, an anemometer or any equivalent sensor for example.

According to an implementation of the invention, the rotational speed of the rotor, the inclination angle of the blades of the wind turbine, the power generated by a conversion machine of the wind turbine obtained from a real-time control and data acquisition system (SCADA) can be measured. A Supervisory Control And Data Acquisition (SCADA) system is a large-scale remote management system allowing processing in real time a large number of remote measurements and controlling technical equipment from a distance. It is an industrial technology in the field of instrumentation whose implementations may be considered as instrumentation structures including a middleware type layer. Preferably, all the measurements can be obtained from the SCADA system, which facilitates the implementation of the method with no particular instruments. Furthermore, the SCADA system can allow accounting for at least one other measurement to make determination of the wind speed in the rotor plane more precise. These measurements can notably be temperatures, electrical data, vibrations, etc. Temperatures can be informative about effective mechanical losses and they therefore allow modelling of the wind turbine to be refined. Accelerometry, combined with a sufficiently fine and relevant modal and vibrational understanding of the structure, can allowing go back to an estimation of the wind and turbulence conditions impacting the wind turbine.

Alternatively, at least one of the measurements can be obtained by a dedicated sensor. For this embodiment:

At least one of a rotor angular rotation sensor can be used to measure the rotational speed of the rotor;

a blade angle sensor used to measure the inclination angle of the blades; and a known and controlled voltage sensor can be used to measure the power generated by the conversion machine and an intensity sensor can be used to measure the current delivered by the generator.

In this step, the measurements can also be stored, notably for the implementation using prior measurements (described hereafter in substep c).

b) Cluster Classification

This substep classifies all the measurements from substep 1/a (wind speed in the rotor plane and rotational speed of the rotor, generated power and inclination angle of the blades) into at least two turbine operating condition classes, also referred to as clusters. This substep may be referred to as "classification" or "data partitioning" substep. In other words, all the measurements are classified into several clusters, each cluster bringing together wind speed sensor measurements and the wind turbine measurements (rotor speed, inclination angle of the blades, generated power) corresponding to similar wind turbine operating conditions.

According to one embodiment of the invention, both types of measurements can be automatically classified by a k-means algorithm, preferably a k-means++ algorithm. Such an algorithm is notably described in the document: "D. Arthur and S. Vassilvitskii, "k-means++: The Advantages of Careful Seeding", Stanford InfoLab, Technical Report 2006-13, June 2006. [Online]. Available: http://Ilpubs.stanford.edu:8090/778/".

Alternatively, any other automatic classification algorithm can be used, for example a hierarchical clustering algorithm or a DBSCAN (Density-Based Spatial Clustering of Applications with Noise) algorithm, etc.

According to one implementation of the invention, the number of clusters can range between 3 and 10, preferably between 4 and 7, and it may be 5 for example. These value ranges allow differentiation between the operating conditions of the wind turbine, while limiting the turbine model construction complexity, which might result in a large number of clusters.

c) Regressions

This substep determines, for each cluster of the previous substep, a regression between the simultaneous measurements of substep a (wind speed in the rotor plane, rotational speed of the rotor, inclination angle of the blades and generated power) by use of a basis function decomposition method and by use of a method allowing establishing a relation between these basis functions and the wind speed in the rotor plane. Advantageously, a Gaussian process regression method and a least-squares regression method can be carried out. These regression methods allow connection of the wind turbine-related measurements (rotational speed of the rotor, inclination angle of the blades, generated power) to the wind speed. The Gaussian process regression method is a non-parametric regression allowing selection of basis functions for the decomposition. Such a Gaussian process regression is flexible and involves no overlearning problem (too many variables and too complex model). The least-squares regression method is an easy to implement parametric regression allowing establishing a relation between the basis functions and the wind speed in the rotor plane. Alternatively, any other regression method which establishes a relationship between these basis functions and the wind speed in the rotor plane can be carried out.

Preferably, the regression accounts for the prior measurements, preferably the regression can take account of a number of prior time intervals to promote precise determination of the wind speed. A number r of last measurements of the rotational speed of the rotor, of the inclination angle of the blades and of the power generated by the conversion machine can therefore be related to the wind speed in the rotor plane. For example, if a history is considered of r=30 prior time intervals, 90 measurements (inputs) are obtained related to the wind speed in the rotor plane in the current time interval, or for at least a future time interval.

A non-limitative example embodiment of this substep is described hereafter:

$\omega_t$ is the angular speed of the rotor at time t, $p_t$ is the power generated at time t, $\beta_t$ is the inclination angle of the blades at time t, and $v_t$ is the wind speed at time t. The purpose is to determine $y_t$ given $x_{t-h}$, by letting $y_t = v_t$, and $$x_{t-h} = \begin{bmatrix} \omega_{t-r:t-h} \\ \beta_{t-r:t-h} \\ p_{t-r:t-h} \end{bmatrix}$$

with r and h integers being selected in such a way that r > h ≥ 0, and a relationship is expressed:

$$\omega_{t-r:t-h} = [\omega_{t-r}, \ldots, \omega_{t-h-1}, \omega_{t-h}]^T$$

The measurements collected between t-r and t-h are thus used to estimate the wind speed at time t. The same notations are used for the inclination angle of the blades and for the generated power. If filtering is used (determination of the current wind speed), h=0, whereas if a wind speed prediction is implemented, h>0, for example h=1 or h=2.

In each cluster, a Gaussian process regression GPR is applied. A kernel k that codifies a priori information on the latent function relating inputs to output is therefore defined:

$$k(x_{a-h}, x_{b-h}) = k_\omega(\omega_{a-r:a-h}, \omega_{b-r:b-h}) + k\beta(\beta_{a-r:r-h}, \beta_{b-r:b-h}) + k_p(p_{a-r:a-h}, p_{b-r:b-h}),$$

with:

$$k_\omega(\cdot,\cdot') = (\cdot)^T L_1^{-1}(\cdot') + \sigma_1^2 \exp(-\tfrac{1}{2}((\cdot)-(\cdot'))^T L_2^{-1}((\cdot)-(\cdot'))),$$

$$k_\beta(\cdot,\cdot') = \sigma_2^2 \exp(-\tfrac{1}{2}((\cdot)-(\cdot'))^T L_3^{-1}((\cdot)-(\cdot'))),$$

$$k_p(\cdot,\cdot') = (\cdot)^T L_4^{-1}(\cdot') + \sigma_3^2 \exp(-\tfrac{1}{2}((\cdot)-(\cdot'))^T L_5^{-1}((\cdot)-(\cdot'))),$$

$$L_i = \mathrm{diag}\{((k-h+1)l_i)^2, \ldots, (2l_i)^2, l_i^2\}.$$

a and b are values of time t, identical or different. In these formulas, the period and the apostrophe correspond to the same argument for the k. For example, for $k_p$, the period corresponds to $p_{a-r:a-h}$ and the apostrophe corresponds to $p_{b-r:b-h}$. Thus, the hyperparameters (noise and variance) of the kernel in the above equation are $l_1, \ldots, l_5, \sigma_1, \sigma_2,$ and $\sigma_3$. The concepts behind this kernel are:
1) the linear contributions (that is those of the form $(\cdot)^T L_i(\cdot')$) account for the fact that the wind speed is expected to be higher when the wind turbine produces more energy and when the rotor speed is higher,
2) the non-linear contributions account for the more complex dynamics of the wind turbine;
3) the matrices Li are as presented in the above equations in order to obtain lower weights for the input components containing more detailed information in the past while keeping a small number of hyperparameters to be selected.

The average function m=0 is used, to obtain all the characteristics of the latent function to be captured by the kernel.

Once the hyperparameters of the kernel of each cluster have been determined, the next step performs the regression. N pairs of measurements $(x_{i-h}, y_i)$ of each cluster can therefore be selected as training data. Selection of the N pairs of measurements allows acceleration of the turbine model construction in relation to an embodiment where all of the measurements are considered. It is noted that, normally, for each point considered in real time $x_*$, an estimation is defined by: $\hat{y}_* = k(x_*, X) K_y y$, with X being the matrix constructed from the N training data and $K_y = k(X,X) + \sigma^2 * I$, with $k(X,X)$, is a matrix such that its value in position (i,j) is $k(x_i, x_j)$, where $x_i$ and $x_j$ are the rows i and j of X, $\sigma^2$ is the noise variance and I is the identity matrix.

However, in a real application, the algorithm estimates $\hat{y}_*$ in real time, and the computing time for $k(x_*, X)$ is dimensioned by the size N of the training data. Indeed, the larger the size of N, the computing time. Furthermore, a large number of training data allows formation of a precise wind turbine model that relates the measured data to the wind speed.

To solve this problem, the method described in the following document may be implemented: «J. Mayer, A. Basarur, M. Petrova, F. Sordon, A. Zea, and U. D. Hanebeck, "Position and Speed Estimation of PMSMs Using Gaussian Processes," in 21st IFAC World Congress, 2020 », which uses the following approximation:

$$\hat{y}_* \approx k(x_*, \overline{X}) \overline{\alpha}$$

$\overline{\alpha}$ is determined as the solution to a regularized least-squares problem:

$$\overline{\alpha} = \operatorname*{argmin}_{\alpha \in \mathbb{R}^M} \|y - \overline{K}_y \alpha\|_2^2 + \mu \|\alpha\|_2^2$$

$$= (\overline{K}_y^T \overline{K}_y + \mu I)^{-1} \overline{K}_y^T y,$$

$\overline{X}$ is obtained by removing a number of rows of X, $\overline{K}_y$ is obtained by removing corresponding rows of Ky, $\mu > 0$ is a regularization coefficient, M is the number of rows of matrix $\overline{X}$. It is noted that $\overline{a}$ only depends on the training data, therefore this value can be stored, then $k(x_*, \overline{X})$ can be calculated for each new point in real time. Removal of the rows of X and Ky allows limitation of the number of calculations, while maintaining a good level of representativity, notably by use of the determined clusters.

Thus, the regression performed allows determination of parameters a and X for each cluster, and these parameters are subsequently used by the wind turbine model in real time.

d) Wind Turbine Model Construction

This substep constructs the wind turbine model by use of regressions determined for each cluster.

Thus, all the regressions for each cluster allow determination of a wind turbine model.

2) Measurements

This step measures in real time:
the rotational speed of the rotor,
the inclination angle of the blades, and
the power generated by the conversion machine which is the power generated by the wind turbine.

Preferably, these measurements can be carried out in the same way as the simultaneous measurements of substep 1/a.

In this step, the measurements can also be stored, notably for the implementation using prior measurements.

According to an embodiment of the invention, at least one of the measurements can be obtained from a real-time control and data acquisition system (SCADA). A Supervisory Control And Data Acquisition (SCADA) system is a large-scale remote management system allowing processing of in real time a large number of remote measurements and controlling technical equipment from a distance. It is an industrial technology in the field of instrumentation whose implementations may be considered as instrumentation structures including a middleware type layer. Preferably, all the measurements can be obtained from the SCADA system, which facilitates the implementation of the method with no particular instruments. Furthermore, the SCADA system can allow accounting for at least one other measurement to make determination of the wind speed in the rotor plane more precise. These measurements can notably be temperatures, electric data, vibrations, etc. Temperatures can inform about effective mechanical losses and they therefore allow modelling of the wind turbine to be refined. Accelerometry, combined with a sufficiently fine and relevant modal and vibrational understanding of the structure, can allow going back to an estimation of the wind and turbulence conditions impacting the wind turbine.

Alternatively, at least one of the measurements can be obtained by use of a dedicated sensor. For this embodiment:
at least one of a rotor angular rotation sensor used to measure the rotational speed of the rotor, and
a blade angle sensor used to measure the inclination angle of the blades, and
a known and controlled voltage sensor used to measure the power generated by the conversion machine and an intensity sensor to measure the current delivered by the generator.

3) Determination of the Wind Speed

This step determines in real time the wind speed in the rotor plane by use of the measurements performed in step 2 and of the model constructed in step 1. Precise determination of the wind speed is obtained.

According to one embodiment of the invention, the current wind speed can be determined.

In a variant, the wind speed can be predicted for at least one future time interval. For example, the wind speed can be predicted for one future time interval or for two future time intervals.

Advantageously, the measurements of step 2 can be associated with at least one cluster determined in substep 1/b, and the regression determined for this cluster is applied to the measurements. Thus, a regression that corresponds to the same operating conditions of the wind turbine is applied.

According to one implementation of the invention, the wind speed in the rotor plane of the wind turbine is determined in real time by determining the Euclidean distance between the real-time measurements of step 2 and the centers of the clusters of the model constructed in substep 1/b. The wind turbine model can then be applied by a weighted combination of regressions of each cluster. The weighting used in this weighted combination can depend on the determined Euclidean distance. Thus, the measurements of step 2 are associated with at least one cluster, which corresponds to the same operating conditions of the wind turbine, determination of the Euclidean distance allows determination of the closest cluster(s), which are therefore those having the same wind turbine operating conditions.

This implementation of the invention can be achieved by the following steps:

C is the number of clusters of the wind turbine model. $\hat{y}_{1,*}, \ldots \hat{y}_{C,*}$ are the values determined for the wind speed for each cluster (from 1 to C). Furthermore, $c_i$ is the center of cluster i, this center is defined from the measurements associated in substep 1/b.

It is possible to combine these determined values by use of a weighted combination defined by:

$$\hat{y}_{final,*} = \frac{\sum_{i=1}^{C} w_i \hat{y}_{i,*}}{\sum_{i=1}^{C} w_i}$$

with $\hat{y}_{final,*}$ being the wind speed thus determined and $w_i$ being the weighting of cluster i with this weighting expressing the relevance of each estimation in relation to the others.

The weighting can be calculated as a function of the Euclidean distance between the measurements considered $x_*$ (which is the determined wind speed) and the cluster being considered. Thus, the weighting can be written as follows:

$$w_i = \frac{1}{\|x_* - c_i\|_2^n}$$

N is a free parameter to be determined, with n>0, the relationship being greater the value of n, the less the contributions of the clusters are removed from the considered measurements.

The extreme case corresponds to the case where $w_i=1$ for the cluster whose center is the closest to the measurements being considered which is $x_*$, and 0 is considered for the others, in other words:

$$w_i = \begin{cases} 1, & i = \mathrm{argmin}_{i \in [1,\ldots,C]} \|x_* - c_i\|_2, \\ 0, & \text{otherwise.} \end{cases}$$

The present invention also relates to a method of controlling at least one wind turbine. The following steps can be carried out for this method:
- determining the wind speed in the rotor plane of the wind turbine by use of the method of determining the wind speed according to any one of the above variants or variant combinations; and
- controlling the wind turbine according to the wind speed in the rotor plane of the wind turbine.

Precise real-time prediction of the wind speed in the rotor plane of the wind turbine allows suitable wind turbine control in terms of minimization of the effects on the turbine structure and maximization of the recovered power. Indeed, this control enables adaptation of the turbine equipments so that the turbine is in the optimum configuration for this wind.

According to an implementation of the invention, the inclination angle of the blades of at least one of the electrical recovery torque of the wind turbine generator and orientation of the nacelle can be controlled depending on the wind speed and direction. Preferably, the individual inclination angle of the blades can be controlled. Other types of regulation devices can be used. Controlling the blade inclination allows optimizing energy recovery according to the incident wind on the blades and to minimize the structure fatigue.

According to an embodiment of the invention, at least one of the inclination angle of the blades and the electrical recovery torque can be determined by use of wind turbine maps depending on the wind speed at the rotor. For example, the control method described in patent application FR-2,976,630 A1 which corresponds to US published patent application 2012-0,321,463 can be applied.

The present invention further relates to a method for at least one monitoring and diagnosis of at least one wind turbine. The following steps can be carried out for this method:
- determining the wind speed in the rotor plane of the wind turbine by use of the method of determining the wind speed according to any one of the above variants or variant combinations; and
- at least one of monitoring and diagnosing the operation of the wind turbine according to the wind speed in the rotor plane.

At least one of monitoring and diagnosis can for example correspond to the mechanical strain undergone by the wind turbine structure according to the wind speed in the rotor plane of the wind turbine.

Furthermore, the invention relates to a computer program product comprising code instructions designed to carry out the steps of one of the methods described above of determining the wind direction, control, and diagnosis method. The program is executed on at least one of a wind turbine control and diagnostic unit.

The invention also relates to a wind turbine, notably an offshore (at sea) or an onshore (on land) wind turbine. The wind turbine is equipped with means for measuring the rotation of the rotor, means for measuring the inclination angle of the blades, and means for measuring the power generated by the conversion machine. Moreover, the wind turbine comprises means for determining the wind speed in the rotor plane able to implement the method of determining the wind speed according to any one of the above variants or variant combinations. According to an embodiment, the wind turbine can be similar to the wind turbine illustrated in FIG. 1.

According to an embodiment of the invention, the wind turbine can comprise a real-time control and data acquisition system (SCADA) including at least one measuring means from among the means for measuring the rotation of the rotor, the means for measuring the inclination angle of the blades and the means for measuring the power generated by the conversion machine. Preferably, the SCADA system can have all these measuring means. Moreover, the SCADA system can comprise additional measuring means (for example temperature, electrical data, . . . ) allowing determination of the wind speed in the rotor plane to be more precise.

Alternatively, the wind turbine can comprise at least one sensor for carrying out at least one of these measurements, such as:
  at least one of a rotor angular rotation sensor for measuring the rotational speed of the rotor;
  a blade angle sensor for measuring the inclination angle of the blades;
  a known and controlled voltage sensor for measuring the power generated by the conversion machine and an intensity sensor for measuring the current delivered by the generator.

For the embodiment of the control method, the wind turbine can comprise control means, for example for control of the inclination angle (or pitch angle) of at least one blade of the wind turbine or of the electrical torque, for implementing the control method according to the invention.

It is clear that the invention is not limited to the embodiments of the methods described above by way of example, and that it encompasses any variant embodiment.

EXAMPLE

The features and advantages of the method according to the invention will be clear from reading the application example hereafter.

The example constructs the wind turbine model by use of the effective wind speed in the rotor plane measured using a LiDAR sensor, the LiDAR measurements being performed simultaneously with SCADA measurements of the rotational speed of the rotor, the inclination angle of the blades and the generated power.

From these measurements, a set of training data $S_{train}$ is formed and classified into 5 clusters by the k-means++ algorithm, and their center is determined. Then, for each cluster, N points are randomly selected to construct matrix X, and M points are selected from among the N points to form matrix $\bar{X}$ so as to carry out the regression step of the method according to the invention. A set of test data $S_{test}$ is then formed from the SCADA measurements and the wind speed is estimated for this data set by use of the wind turbine model.

For this example, the sampling time of the SCADA measurements is one second and the sampling time of the data supplied by the LiDAR sensor is 0.25 second. For this example, selections are r=20, N=50,000 and M=3,000.

Figure 3:
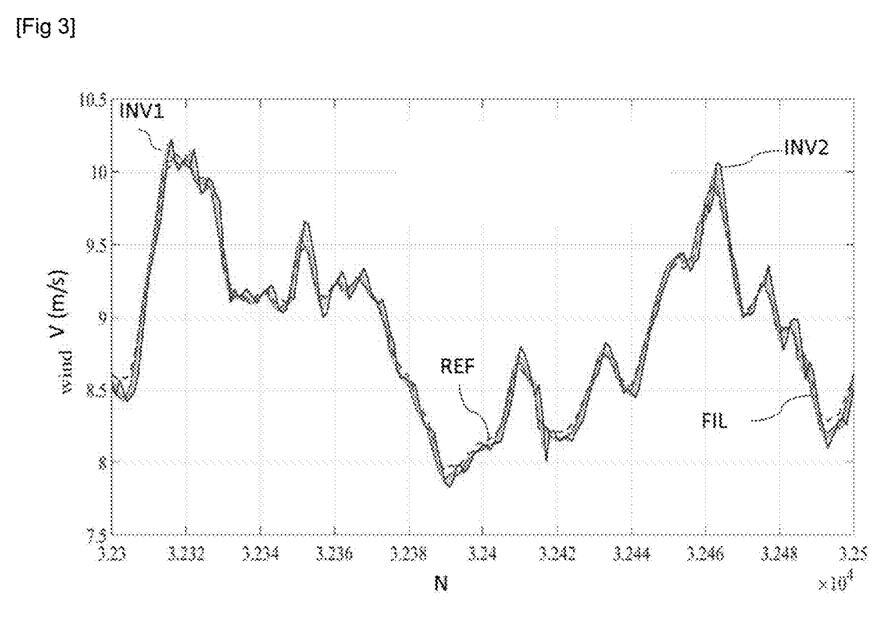
FIG. 3 illustrates curves of the effective wind speed in the rotor plane as a function of time, including a reference curve and three curves obtained with the method according to three embodiments of the invention for an application example.

FIG. 3 illustrates the effective wind speed v in m/s as a function of the number of points No (which is a function of time). This figure shows:
  reference curve REF obtained from the LiDAR measurements
  wind speed curve FIL obtained with the method according to a first embodiment of the invention where h=0, that is a determination of the effective speed of the current wind;
  wind speed curve INV1 obtained with the method according to a second embodiment of the invention where h=1, which is a prediction of the effective wind speed for a future time interval; and
  wind speed curve INV2 obtained with the method according to a third embodiment of the invention where h=2, i.e. a prediction of the effective wind speed for two future time intervals.

It is noted that the four curves are nearly superimposed, which implies that the three embodiments of the invention provide precise determination of the wind speed in the rotor plane, for the current time as well as for one or two future time intervals.

The invention claimed is:

1. A method of operating a wind turbine having a rotor with blades and a conversion machine by making measurements of a wind speed in a rotor plane of the wind turbine, rotational speed of the rotor, an inclination angle of the blades and a power generated by the conversion machine, the method comprising:
  classifying the measurements of the wind speed in the rotor plane, the rotational speed of the rotor, the inclination angle of the blades and the power generated by the conversion machine into at least two classes of wind turbine operating conditions;
  performing a regression of each of the at least two classes of the wind turbine operating conditions between the measurements of the wind speed in the rotor plane, the rotational speed of the rotor, the inclination angle of the blades and the power generated by the conversion machine by using a basis function decomposition method establishing a relationship between basis functions of the basis function decomposition method and the wind speed in the rotor plane by use of a Gaussian process regression method and a least-squares regression method;
  constructing a model of the wind turbine using the regressions of each of the at least two classes of the wind turbine operating conditions which relates the rotational speed of the rotor, the inclination angle of the blades and the power generated by the conversion machine to the wind speed in the rotor plane;
  measuring in real time the rotational speed of the rotor, the inclination angle of the blades and the power generated by the conversion machine of the wind turbine;
  determining in real time the wind speed in the rotor plane by using the real time measurements of the rotational speed of the rotor, the inclination angle of the blades and the power generated by the conversion machine of the wind turbine and the model of the wind turbine; and
  controlling at least one of the inclination angle of the blades of the wind turbine, the power generation of the conversion machine, torque of the wind turbine, and the orientation of a nacelle of the wind turbine dependent on the determined real time wind speed.

2. The method of operating the wind turbine as claimed in claim 1, wherein the measurements of the wind speed in the rotor plane, the rotational speed of the rotor, the inclination angle of the blades and the power generated by the conversion machine are classified into the at least two classes of the wind turbine operating conditions by using a k-means algorithm classification method.

3. The method of operating the wind turbine as claimed in claim 2, wherein the k-means algorithm classification method is a ++algorithm.

4. The method of operating the wind turbine as claimed in claim 2, wherein a number of classes of the wind turbine operating conditions ranges between 3 and 10.

5. The method of operating the wind turbine as claimed in claim 4, wherein the number of classes of the wind turbine operating conditions ranges between 4 and 7.

6. The method of operating the wind turbine as claimed in claim 2, wherein the wind speed in the rotor plane is measured based on LiDAR sensor measurements.

7. The method of operating the wind turbine as claimed in claim 2, wherein the wind speed in the rotor plane of the wind turbine of the model of the wind turbine is based on a Euclidean distance between the real-time measurements of the rotational speed of the rotor, the inclination angle of the blades and the power generated by the conversion machine of the wind turbine and a center of each class of the wind turbine operating conditions, with the model of the wind turbine being applied by using a weighted combination of regressions of each class of the wind turbine operating conditions dependent on the Euclidean distance.

8. The method of operating the wind turbine as claimed in claim 1, wherein a number of classes of the wind turbine operating conditions ranges between 3 and 10.

9. The method of operating the wind turbine as claimed in claim 8, wherein the number of classes of the wind turbine operating conditions ranges between 4 and 7.

10. The method of operating the wind turbine as claimed in claim 1, wherein the wind speed in the rotor plane is measured by LiDAR sensor measurements.

11. The method of operating the wind turbine as claimed in claim 1, wherein the wind speed in the rotor plane of the wind turbine is predicted for at least one future time interval of the model of the wind turbine by the real time measurements of the rotational speed of the rotor, the inclination angle of the blades and the power generated by the conversion machine.

12. The method of operating the wind turbine as claimed in claim 1, wherein the wind turbine comprises:
    means for determining the wind speed in the rotor;
    means for measuring the rotational speed of the rotor;
    means for measuring the inclination angle of the blades; and
    means for measuring the power generated by the conversion machine.

13. The method of operating the wind turbine as claimed in claim 12, wherein the wind turbine comprises a real-time control and data acquisition system including the means for measuring the rotational speed of the rotor, the means for measuring the inclination angle and the means for measuring the power generated by the conversion machine.

14. The method of operating the wind turbine as claimed in claim 12, wherein the wind speed in the rotor plane of the wind turbine is predicted for at least one time interval by the real time measurements of the rotational speed of the rotor, the inclination angle of the blades and the power generated by the conversion machine.

15. The method of operating the wind turbine as claimed in claim 1, wherein the wind speed in the rotor plane of the wind turbine is predicted for at least one time interval of the model of the wind turbine.

16. A method of operating a wind turbine having a rotor with blades and a conversion machine by making measurements of a wind speed in a rotor plane of the wind turbine, rotational speed of the rotor, an inclination angle of the blades and a power generated by the conversion machine, the method comprising:
    classifying the measurements of the wind speed in the rotor plane, the rotational speed of the rotor, the inclination angle of the blades and the power generated by the conversion machine into at least two classes of wind turbine operating conditions;
    performing a regression of each of the at least two classes of the wind turbine operating conditions between the measurements of the wind speed in the rotor plane, the rotational speed of the rotor, the inclination angle of the blades and the power generated by the conversion machine by using a basis function decomposition method establishing a relationship between basis functions of the basis function decomposition method and the wind speed in the rotor plane by use of a Gaussian process regression method and a least-squares regression method;
    constructing a model of the wind turbine using the regressions of each of the at least two classes of the wind turbine operating conditions which relate the rotational speed of the rotor, the inclination angle of the blades and the power generated by the conversion machine to the wind speed in the rotor plane;
    measuring in real time the rotational speed of the rotor, the inclination angle of the blades and the power generated by the conversion machine of the wind turbine;
    determining in real time the wind speed in the rotor plane by using the real time measurements of the rotational speed of the rotor, the inclination angle of the blades and the power generated by the conversion machine of the wind turbine and the model of the wind turbine; and
    controlling the wind turbine to monitor and diagnose mechanical strain on structure of the wind turbine according to the determined real time wind speed in the rotor plane.

* * * * *